United States Patent
Sarkar et al.

(10) Patent No.: US 9,473,371 B2
(45) Date of Patent: Oct. 18, 2016

(54) METHOD AND SERVER FOR DYNAMICALLY DETERMINING A REFERENCE SIGNAL (RS) POWER BOOST LEVEL

(71) Applicant: TELEFONAKTIEBOLAGET L M ERICSSON (PUBL), Stockholm (SE)

(72) Inventors: Debasish Sarkar, Irvine, CA (US); Karupaiah Rajendran, Bangalore (IN); Ayan Sen, Gurgaon (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 14/227,216

(22) Filed: Mar. 27, 2014

(65) Prior Publication Data

US 2015/0281017 A1 Oct. 1, 2015

(51) Int. Cl.
| | | |
|---|---|---|
| H04L 12/26 | (2006.01) | |
| H04L 5/00 | (2006.01) | |
| H04W 52/32 | (2009.01) | |
| H04W 52/24 | (2009.01) | |
| H04W 52/34 | (2009.01) | |
| H04W 52/36 | (2009.01) | |

(52) U.S. Cl.
CPC ............ *H04L 43/08* (2013.01); *H04L 5/0005* (2013.01); *H04L 5/0048* (2013.01); *H04W 52/325* (2013.01); *H04W 52/241* (2013.01); *H04W 52/346* (2013.01); *H04W 52/367* (2013.01)

(58) Field of Classification Search
CPC . H04L 5/005; H04L 25/0204; H04L 5/0023; H04L 1/0606; H04L 1/0618
See application file for complete search history.

(56) References Cited

U.S. PATENT DOCUMENTS

| | | | | |
|---|---|---|---|---|
| 8,102,936 B2 * | 1/2012 | Sidiropoulos | ......... | H04L 7/0008 375/220 |
| 2011/0003551 A1 * | 1/2011 | Kameno | ............ | H04W 52/325 455/62 |
| 2011/0149747 A1 * | 6/2011 | Kotrla | ................. | H04L 12/2697 370/242 |
| 2011/0159898 A1 * | 6/2011 | Venkatachalam | ..... | H04W 52/10 455/501 |

(Continued)

FOREIGN PATENT DOCUMENTS

| | | |
|---|---|---|
| EP | 2249496 A1 | 11/2010 |
| EP | 2693813 A1 | 2/2014 |

(Continued)

OTHER PUBLICATIONS

NTT DOCOMO, et al.: "Power Boosting of Reference Signal in E-UTRA Downlink," 3GPP Draft; R1-071640; 3rd Generation Partnership Project, Mobile Competence Centre, 650, route des Lucioles, F-06921 Sophia-Antipolis Cedex, France; Mar. 26, 2007.

*Primary Examiner* — Afshawn Towfighi
*Assistant Examiner* — Lakeram Jangbahadur

(57) ABSTRACT

A method and application server for dynamically determining a Reference Signal (RS) Power Boost level in a radio telecommunication network. The application server may be a Self-Optimized Network (SON) application server configured to received network performance information from Performance Management (PM) counters and configuration information from a configuration database server. The application server monitors a plurality of network Key Performance Indicators (KPIs), compares the KPIs to associated thresholds, and derives and assigns values to KPI threshold factors. The server calculates a scaling factor based on values of the KPI threshold factors, and calculates a dynamic RS Power Boost level by applying the scaling factor to a baseline RS Power Boost level.

21 Claims, 5 Drawing Sheets

(56) References Cited

U.S. PATENT DOCUMENTS

2013/0324179 A1* 12/2013 Zhang ............... H04W 52/241
  455/522

FOREIGN PATENT DOCUMENTS

| KR | WO 2009/108011 A1 * | 9/2009 | ............ H04W 52/32 |
| WO | 2009/108011 A1 | 9/2009 | |

* cited by examiner

One antenna port

☒ TRANSMISSION OF
RS ON ANTENNA PORT 0

Two antenna ports

Antenna port 0          Antenna port 1

☒ TRANSMISSION OF RS ON ANTENNA PORT 0
☒ NO TRANSMISSION

☒ TRANSMISSION OF RS ON ANTENNA PORT 1
☒ NO TRANSMISSION

METHOD AND SERVER FOR DYNAMICALLY DETERMINING A REFERENCE SIGNAL (RS) POWER BOOST LEVEL

TECHNICAL FIELD

The present disclosure relates generally to communication systems and more particularly to a method of dynamically determining a Reference Signal (RS) Power Boost level in a radio telecommunication network.

BACKGROUND

A Reference Signal (RS) is a symbol used for Channel quality estimation and coherent demodulation in the downlink. To demodulate different downlink physical channels coherently, a User Equipment (UE) requires complex valued channel estimates for each subcarrier.

In the Long Term Evolution (LTE) radio access network, known reference symbols are inserted into a time-frequency resource grid. The reference signal is mapped to resource elements spread evenly in the resource grid, in an identical pattern in every resource block.

FIG. 1 is a diagram depicting time-frequency resource grids with typical Cell-specific Reference Signal (CRS) positions for one-antenna port and two-antenna port configurations. When transmitting with several antennas, each antenna must transmit a unique reference signal. When one antenna transmits its reference signal, the other antenna must be silent, as shown by the Xs in the reference symbol locations. The mapping of the reference signal on the resource grid therefore depends on the antenna configuration. The pattern of reference signals can be shifted in frequency compared to FIG. 1. Which one of the six possible frequency shifts to use depends on the Physical Cell Identity (PCI) sent on the Primary Synchronization Signal (PSS) and the Secondary Synchronization Signal (SSS).

In the conventional LTE System, the Cell Specific Reference Signal (CRS) power can be provisionally boosted by 3 dB when an RS Power Boost parameter is enabled by making use of the unused power available due to the corresponding silent resource element. The unused power of the silent resource element can be added to the reference signal resource element when the RS Power Boost parameter is enabled. This in turn leads to a 3 dBb boost of the Reference Signal Resource Element Power in comparison to the default value.

The existing method of CRS Power Boost by 3 dB or any other fixed value may unnecessarily increase the CRS footprint of the RS Power Boost-enabled Cell Site which could possibly degrade the radio network performance due to several reasons. First, the existing method may degrade the cell-edge performance of an overlapping cluster of cell sites by becoming a potential interferer due to the higher degree of overlap with its neighboring cell site clusters. Second, the existing method may increase the handover failure rate to same or legacy technologies. Third, the existing method may potentially reduce the average cell-site throughput and the connected user capacity if the power boost leads to covering unwanted far-off users operating in a lower order modulation and coding scheme (MCS) and in transmit diversity, i.e., Multiple Input Multiple Output (MIMO) schemes with a greater number of retransmissions than before. Fourth, the existing method may increase the Uplink (UL) Received Signal Strength Indicator (RSSI), i.e., the uplink noise and interference level which can potentially degrade the uplink throughput performance. Fifth, the existing method may increase the Random Access Channel (RACH) failure rate due to coverage imbalance between the UL and DL.

SUMMARY

It is an object of the present disclosure to optimize network resource utilization by mitigating the above situations arising due to the use of a static 3 dB RS power boost value. In different embodiments, the present disclosure considers several network performance factors in order to dynamically determine a varying level of RS power boost. These factors may consider coverage, capacity, and quality indicators to dynamically determine an optimal level of RS power boost level, thereby striking a proper balance between interference level and coverage reliability at the cell edge.

According to a first embodiment, a method performed in an application server for dynamically determining a Reference Signal (RS) power boost level in a radio telecommunication network is provided. The method includes monitoring a plurality of network performance indicators; calculating a scaling factor based on values of the plurality of network performance indicators; and calculating a dynamic RS Power Boost level by applying the scaling factor to a baseline RS Power Boost level.

A second embodiment provides an application server configured to dynamically determine an RS Power Boost level in a radio telecommunication network. The application server includes a receiving interface configured to receive network performance information and configuration parameters from the network; and one or more processing circuits configured to: derive a plurality of network performance indicators from the received performance information and configuration parameters; calculate a scaling factor based on values of the plurality of network performance indicators; and calculate a dynamic RS Power Boost level by applying the scaling factor to a baseline RS Power Boost level.

A third embodiment provides a Self-Optimized Network (SON) for optimizing performance in the SON and an associated radio access network. The SON includes a plurality of Performance Management (PM) counters configured to measure and report network performance information; a database server configured to mediate network configuration parameters; and a SON application server configured to dynamically determine an RS Power Boost level. The SON application server includes a receiving interface configured to receive the network performance information from the PM counters and the configuration parameters from the database server; and one or more processing circuits configured to: derive a plurality of network performance indicators from the performance information and configuration parameters received during a monitoring time interval; calculate a scaling factor based on values of the plurality of network performance indicators; and calculate a dynamic RS Power Boost level by applying the scaling factor to a baseline RS Power Boost level.

A fourth embodiment provides a computer program product comprising program instructions stored on a non-transitory, computer-readable medium in an application server. When the program instructions are executed by one or more processors, the application server is caused to dynamically determine an RS Power Boost level in a radio telecommunication network by monitoring a plurality of network performance indicators; calculating a scaling factor based on values of the plurality of network performance indicators; and calculating a dynamic RS Power Boost level by applying the scaling factor to a baseline RS Power Boost level.

The computer-readable medium may be a permanent or rewritable memory within the application server or located externally. The respective computer program may also be transferred to the application server, for example via a cable or a wireless link as a sequence of signals.

The present disclosure overcomes the problems that arise from utilizing the conventional fixed value of 3 dB for the Cell Specific Reference Signal (CRS) Power Boost. By monitoring a number of Key Performance Indicators (KPIs) and comparing the KPIs with user-defined thresholds, a scaling factor for the RS Power Boost is dynamically and intelligently determined and applied to the RS Power Boost. As a result, unnecessary coverage overlap can be prevented, leading to optimal management of inter-cell interference. The dynamic RS Power Boost also helps to achieve optimal throughput by providing a stronger reference signal to the most deserving users, and potentially reduces the risk of an increased Random Access Channel (RACH) Failure Rate due to coverage imbalance between the Uplink and Downlink. Further features and benefits of embodiments of the disclosure will become apparent from the detailed description below.

BRIEF DESCRIPTION OF THE DRAWINGS

In the following section, the disclosure makes reference to exemplary embodiments illustrated in the figures, in which.

DETAILED DESCRIPTION

The present invention will now be described more fully hereinafter with reference to the accompanying drawings, in which preferred embodiments of the invention are shown. In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with GSM/UMTS/LTE standard terminology to illustrate the present invention, they are equally applicable to other kinds of mobile communication systems. Further, the term User Equipment (UE) used herein may be any kind of mobile communication device like a mobile telephone, a Personal Digital Assistant (PDA), a network card, a laptop or any other mobile communication apparatus which is capable of communicating wirelessly (via an air interface) or wired with a network.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a non-transitory memory coupled to the processor, wherein the memory is encoded with one or more programs that perform the method when executed by the processor.

Figure 1:
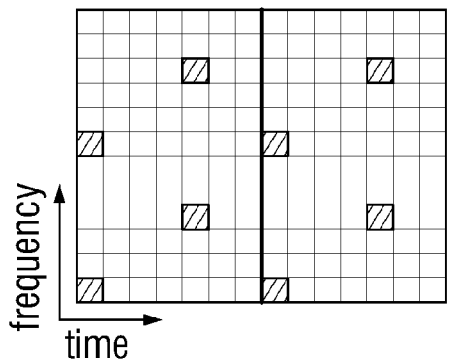
FIG. 1 is a diagram depicting time-frequency resource grids with typical Cell-specific Reference Signal (CRS) positions for one-antenna port and two-antenna port configurations.
Figure 1:
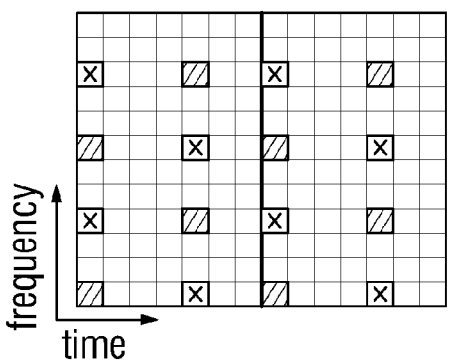
Figure 1:
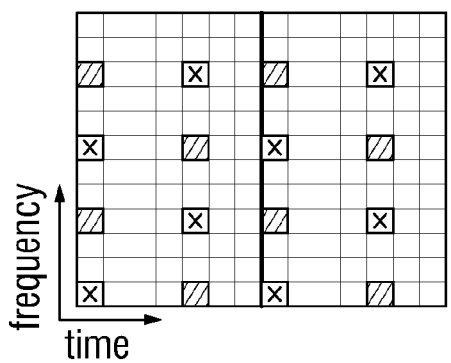
Figure 2:
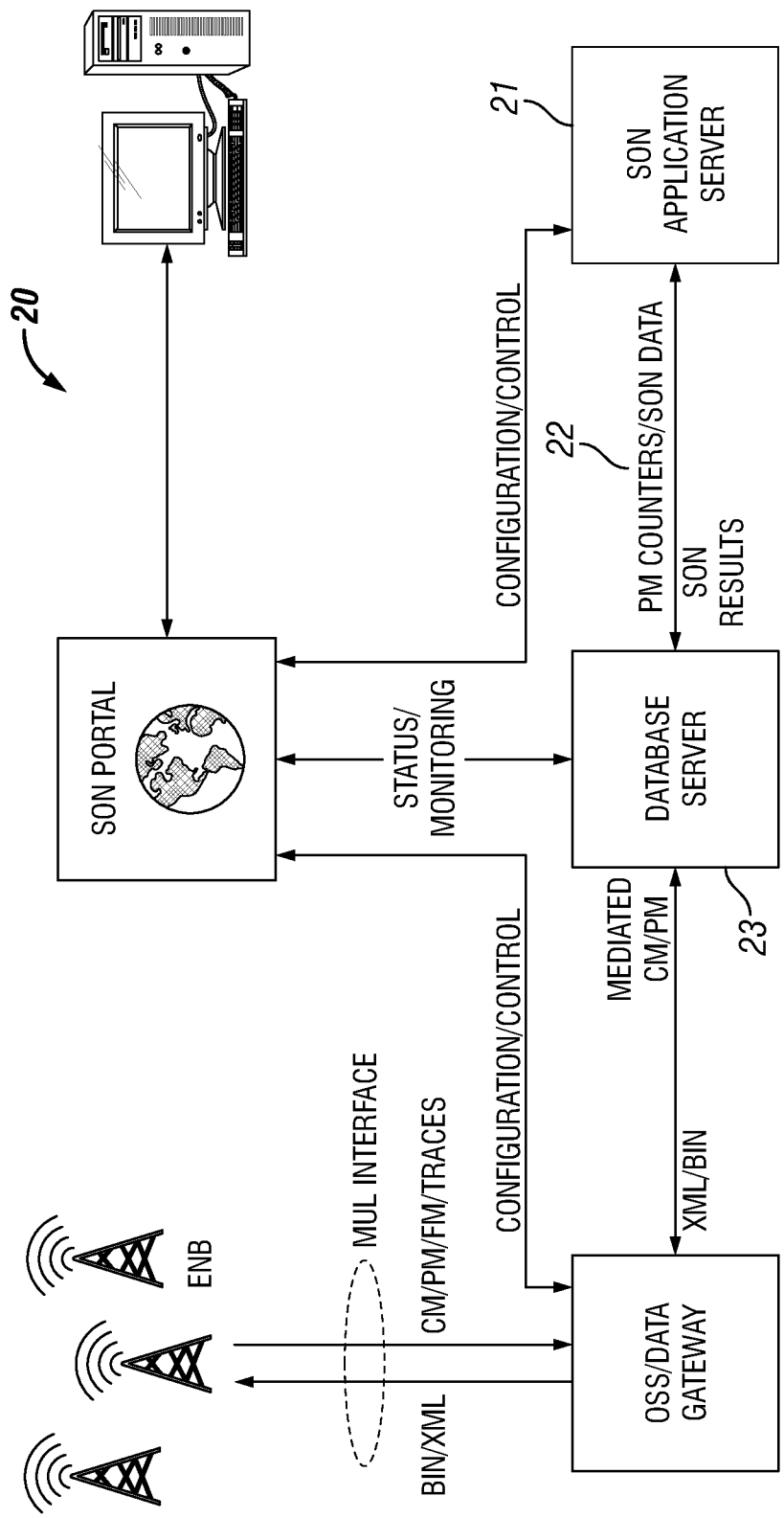
FIG. 2 is a simplified block diagram of an exemplary embodiment of a partial network architecture in which a Self-Optimized Network (SON) Application Server is modified according to the present disclosure.

FIG. 2 is a simplified block diagram of an exemplary embodiment of a partial network architecture 20 in which a Self-Optimized Network (SON) Application Server 21 is modified according to the present disclosure. Based on traffic loads reported by Performance Management (PM) counters 22 in the nodes of the network and configuration parameters mediated in the database server 23, certain Key Performance Indicators (KPIs) are monitored and compared with user-defined thresholds to determine KPI threshold factors that may be set, for example, in the SON Application Server 21. A monitoring period, which may be user defined, may range, for example, from 15 minutes to two or three days based on data availability and server capacity used for this purpose. For any SON algorithm, the accuracy increases with the confidence interval, so a longer confidence interval is preferred when resources are available to support the measurement process.

The KPIs threshold factors may include the following:
1. AvgDlCqiThreshFactor
2. AvgUlSinrThreshFactor
3. AvgUlRssiThreshFactor
4. MaxTaThreshFactor
5. PHRThreshFactor
6. MaxUlDlBlerThreshFactor
7. PrbUlDlUtilizationThresh Factor
8. PrachFailTdThreshFactor
9. ConnectUsersThreshFactor
10. IntraLteNbrThreshFactor
11. MimoModeThreshFactor The KPIs may be continually monitored at the cell level as inputs to the process of dynamically determining a desired level of RS Power Boost. The value of each associated KPI threshold factor is set to either 0 or 1, depending on the evaluation of each KPI threshold factor as described below.

Figure 3:
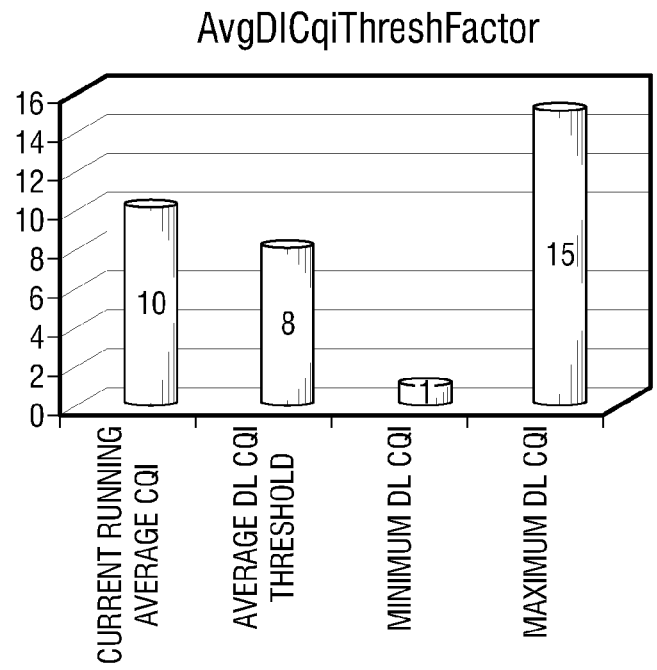
FIG. 3 provides a graphical depiction of how the Average DL CQI Threshold factor (AvgDlCqiThreshFactor) is evaluated.

1. Average DL CQI Threshold Factor (AvgDlCqiThreshFactor):

FIG. 3 provides a graphical depiction of how the Average DL CQI Threshold factor (AvgDlCqiThreshFactor) is evaluated. The AvgDlCqiThreshFactor is computed based on the degree of deviation between the Current Running Average DL CQI and the Average DL CQI Threshold set for RS Power Boost computation purposes. Thus:

$$\text{AvgDlCqiThreshFactorEval} = [(\text{Current Running Avg CQI} - \text{Avg DL CQI Threshold})/(\text{Max DL CQI} - \text{Avg DL CQI Threshold})]$$

If the value is positive, i.e., Current Running Average CQI Value is higher than the Average DL CQI Threshold, set AvgDlCqiThreshFactor=1.

If the value is negative, i.e., Current Running Average CQI Value is less than the Average DL CQI Threshold, set AvgDlCqiThreshFactor=0

It is imperative to increase the Power boost for cases where the current running CQI has high values.

Figure 4:
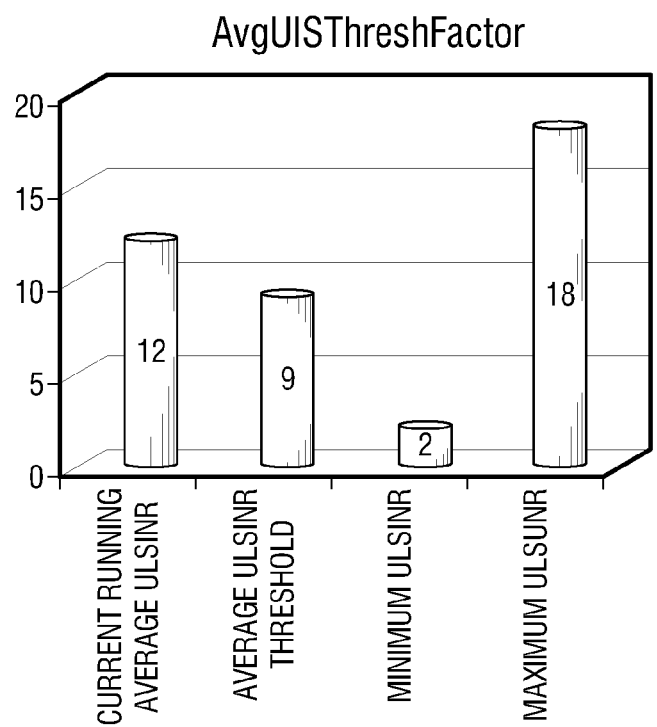
FIG. 4 provides a graphical depiction of how the Average UL SINR Threshold factor (AvgUlSinrThreshFactor) is evaluated.

2. Average UL SINR Threshold Factor (AvgUlSinrThreshFactor):

FIG. 4 provides a graphical depiction of how the Average UL SINR Threshold factor (AvgUlSinrThreshFactor) is evaluated. The AvgUlSinrThreshFactor is computed based on the degree of deviation between the Current Running Average UL SINR and the Average UL SINR Threshold set for RS Power Boost computation purposes. Thus:

AvgulSinrThreshFactorEval=[(Current Running Avg UL SINR−Avg UL SINR Threshold)/(Max UL SINR−Avg UL SINR Threshold)]

If the value is positive, i.e., Current Running Average UL SINR Value is higher than the Average UL SINR Threshold, set AvgUlSinrThreshFactor=1.

If the value is negative, i.e., Current Running Average UL SINR Value is less than the Average UL SINR Threshold, set AvgUlSinrThreshFactor=0

It is imperative to increase the Power boost for cases where the current running UL SINR has high values.

3. Average UL RSSI Threshold Factor (AvgUlRssiThreshFactor):

The AvgUlRssiThreshFactor is computed based on the degree of deviation between the Current Running Average UL RSSI and the Average UL RSSI Threshold set for RS Power Boost computation purposes.

When the Current Running Average UL RSSI Value is higher than the Average UL RSSI Threshold, set AvgUlRssiThreshFactor=0.

When the Current Running Average UL RSSI Value is lower than the Average UL RSSI Threshold, set AvgUlRssiThreshFactor=1.

The objective is to give preference for cells exhibiting low UL RSSI values for setting a higher RS Power Boost value.

4. Max Timing Advance Value Threshold Factor (MaxTaThreshFactor):

Whenever the UE has DL Data to receive or UL Data to send, the UE needs to establish a Radio Resource Control (RRC) connection with the eNB. The UE transmits a Random Access Preamble, and the eNB estimates the transmission timing of the UE based on this transmission. The eNB then transmits a Random Access Response, which includes a timing advance command. Based on that command, the UE adjusts its transmit timing.

The timing advance is initiated from the Evolved Universal Terrestrial Radio Access Network (E-UTRAN) with a Media Access Control (MAC) message that identifies an adjustment of the timing advance. The MaxTaThreshFactor is computed based on the degree of deviation between the Current Running Max Timing Advance value and the maximum allowed Timing Advance Threshold set based on the predetermined allowed maximum cell size in a defined interval.

When the Current Running Max Timing Advance value is higher than the maximum allowed Timing Advance Threshold in a defined time interval, set MaxTaThreshFactor=0.

When the Current Running Max Timing Advance value is lower than the maximum allowed Timing Advance Threshold in a defined time interval, set MaxTaThreshFactor=1.

The objective is to give preference for cells exhibiting low TA values for setting a higher RS Power Boost value.

5. Power Headroom Report Threshold Factor (PHRThreshFactor):

The UE reports power headroom measurements in order to inform the uplink packet scheduler in the eNodeB how close the UE is operating to its maximum power capabilities. That is, the power headroom indicates how much transmission power remains for a UE to use in addition to the power being used by the current transmission. The eNodeB (RBS) uses this reported value to estimate how much uplink bandwidth a UE can use for a specific subframe. When more resource blocks are scheduled for the UE, higher UE transmit power is required. However, the UE transmit power cannot exceed the UE max transmit power capability. So the UE cannot use much resource block (bandwidth) if the UE does not have enough power headroom.

The eNodeB (RBS) monitors the number of times the Power Headroom Report from the UE is close to zero with the minimum Physical Resource Block (PRB) allocation (for example, for an instance with 2 UL-SCH PRB) along with the least MCS assigned. This counter is an indication that the UL Path loss corresponds to the maximum allowable value (cell edge UEs). The PHRThreshFactor is computed based on the degree of closeness to the PHR Threshold counter value.

When the Tbs Power Restricted counter value does not exceed the PHR Threshold Value during the monitoring interval, set PHRThreshFactor=1.

When the Tbs Power Restricted counter value exceeds the PHR Threshold Value during the monitoring interval, set PHRThreshFactor=0.

6. BLER Threshold Factor (MaxUlDlBlerThreshFactor):

The Block Error Rate (BLER) Threshold factor in both the Uplink and Downlink is a measure of an in-sync or out-of-sync indication during radio link monitoring. The maximum of either the Uplink or the Downlink BLER Threshold factor value is considered for purposes of computing the RS Power Boost Computation.

When the Average DL/UL BLER Threshold Counter Value is not reached during the monitoring interval, set MaxUlDlBlerThreshFactor=1.

When the Average DL/UL BLER Threshold Counter Value is exceeded during the monitoring interval, set MaxUlDlBlerThreshFactor=0.

The objective is to give preference for cells exhibiting low DL/UL BLER values for setting a higher RS Power Boost value.

7. PRB/SCH Utilization Factor (PrbUlDlUtilizationThreshFactor):

The PrbUlDlUtilizationThreshFactor is computed based on the degree of deviation between the Current Running Average UL/DL PRB Utilization and the Average UL/DL PRB Utilization Threshold set for RS Power Boost computation purposes in a predefined time interval. Thus:

$$PrbUlDlUtilizationThreshFactorEval =$$
$$[(\text{Average } UL/DL\ PRB \text{ Utilization Threshold} -$$
$$\text{Current Running } Avg\ PRB \text{ Utilization})/$$
$$(\text{Average } UL/DL\ PRB \text{ Utilization Threshold} - \text{Min } PRB \text{ Utilization})]$$

When the Current Running Average UL/DL PRB Utilization Value is lower than the Average UL/DL PRB Utilization Threshold, set PrbUlDlUtilizationThreshFactor=1.

When the Current Running Average UL/DL PRB Utilization Value is higher than the Average UL/DL PRB Utilization Threshold, set PrbUlDlUtilizationThreshFactor=0, indicating that RS Power Boost is not required at this point.

8. RACH Failure Rate Threshold Factor (PrachFailTdThreshFactor):

Whenever the UE has DL Data to receive or UL Data to send, the UE needs to establish an RRC connection with the eNodeB. The UE transmits a Random Access Preamble, and the eNodeB estimates the transmission timing of the terminal based on the Preamble. The eNodeB then transmits a Random Access Response, which includes a timing advance and a power control command. Based on the Response, the UE adjusts its transmit timing and its transmit Power.

The PrachFailTdThresh counter is incremented if the eNodeB is unable to decode any information in the assigned UL grant. This may occur when the UE is unable to meet either the timing advance or the commanded UE transmit power due to its distance from the eNodeB. In this case, the cell is categorized as covering a larger footprint if the PrachFailTdThresh value is reached or exceeded, and RS Boost Power shall not be recommended.

When the PrachFailTdThresh Counter Value is not reached during the monitoring interval, set PrachFailTdThreshFactor=1.

When the PrachFailTdThresh Counter Value is exceeded during the monitoring interval, set PrachFailTdThreshFactor=0.

9. Connected Users Limit Threshold Factor (ConnectUsersThreshFactor):

The ConnectUsersThreshFactor indicates a limit for the number of connected users.

When the ConnectUsers Threshold Counter Value is not exceeded during the monitoring interval, set ConnectUsersThreshFactor=1.

When the Connect Users Threshold Counter Value is exceeded during the monitoring interval, set ConnectUsersThreshFactor=0.

10. IntraLTE Neighbor Threshold Factor (IntraLteNbrThreshFactor):

The IntraLteNbrThreshold indicates a limit for the Intra-LTE Neighbor Threshold.

When the number of defined intra-LTE neighbors is less than the IntraLteNbrThreshold, set IntraLteNbrThreshFactor=1.

When the number of defined intraLTE neighbors is greater than the IntraLteNbrThreshold, set IntraLteNbrThreshFactor=0.

The RS Power Boost should be discouraged for cell sites with a maximum Neighbor List because it could lead to potential interference.

11. MIMO Mode Threshold Factor (MimoModeThreshFactor):

The MimoModeThreshold indicates a limit for the MIMO Mode (Spatial Multiplexing) Activity Threshold.

A TxRankDistribution counter gives detailed information on how much each transmission mode and rank is used in regards to Transmit Diversity: Open Loop SM Rank 1; Open Loop SM Rank 2; Closed Loop SM Rank 1; Closed Loop SM Rank 2.

When the value of the TxRankDistribution counter for MIMO exceeds the value of the MimoModeThreshold, set MimoModeThreshFactor=1.

When the value of the TxRankDistribution counter for MIMO does not exceed the value of the MimoModeThreshold, set MimoModeThreshFactor=0.

The RS Power Boost should be discouraged for cell sites that are already operating in transmit diversity mode most of the time for coverage purposes.

Figure 5:
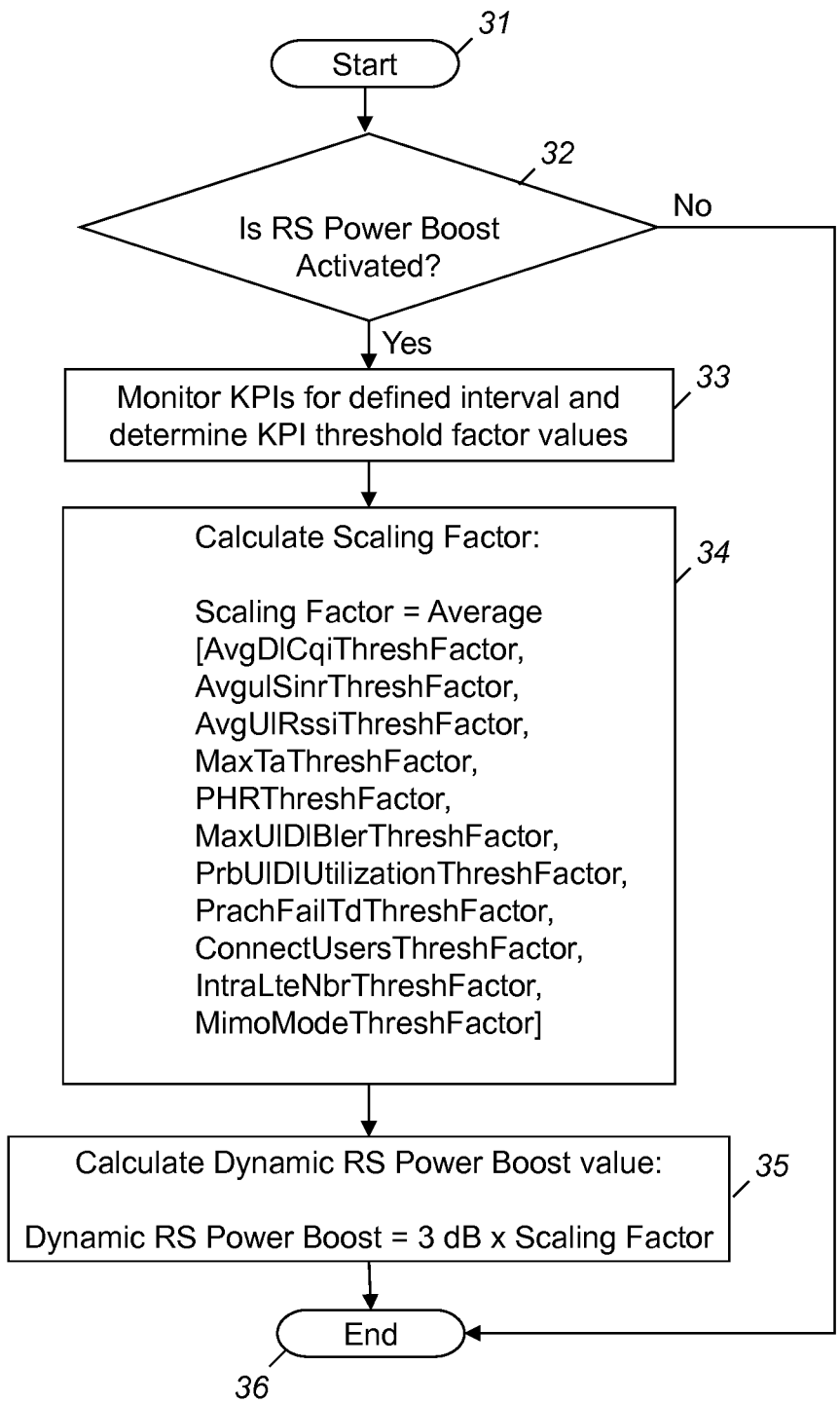
FIG. 5 is a flow chart illustrating the steps of an exemplary embodiment of the method of the present disclosure.

FIG. 5 is a flow chart illustrating the steps of an exemplary embodiment of the method of the present disclosure. In this embodiment, the RS Power Boost value is given a maximum possible value of 3 dB. According to the disclosure, this maximum 3 dB value is scaled downward by a scaling factor, which is determined as a function of the factors described above.

The method starts at step 31 and moves to step 32 where it is determined whether RS Power Boost is activated. If not, the process ends at step 36. However, when RS Power Boost is activated, the method moves to step 33 where the KPIs are monitored for the user-defined interval and the value of each KPI threshold factor (1 or 0) is determined. At step 34, the scaling factor is calculated. In this embodiment, the scaling factor is calculated as the average of the eleven KPI threshold factors described above. Thus:

$$\text{Scaling Factor} = \text{Average}[AvgDlCqiThreshFactor, AvgUlSinrThreshFactor,$$
$$AvgUlRssiThreshFactor, MaxTaThreshFactor, PHRThreshFactor,$$
$$MaxUlDlBlerThreshFactor, PrbUlDlUtilzationThreshFactor,$$
$$PrachFailTdThreshFactor, ConnectUsersThreshFactor,$$
$$IntraLteNbrThreshFactor, MimoModeThreshFactor].$$

For example, if the sum of the eleven KPI threshold factors is 6 (i.e., six of the KPI threshold factors have a value of 1, and five of the factors have a value of 0), the scaling factor would be 0.545 (i.e., $6/11$).

In other embodiments, fewer of the eleven KPI threshold factors may be utilized for calculating the scaling factor, although utilizing all eleven may provide a more optimal result. Additional factors may also be defined and included in the calculation. In one embodiment, additional factors may be created by mixing the above KPI's in different proportions. In some embodiments, different weightings may be applied to each KPI threshold factor to bias the decision based on coverage or network capacity limits. The Scaling Factor is then calculated using the weighted average of the KPI threshold factors.

The method then moves to step 35 where the dynamic RS Power Boost value is calculated. In one exemplary embodiment, the scaling factor is calculated as:

Dynamic RS Power Boost Value=3 dB*Scaling Factor

The value of 3 dB is the maximum allowed RS Power Boost level and is used as a baseline level, which is scaled downward in this embodiment. Using the example above, where the sum of the eleven KPI threshold factors is 6 and the scaling factor is 0.545, the Dynamic RS Power Boost Value would then be:

3 dB*0.545=1.636 dB.

As can be appreciated, other ways of dynamically adjusting the RS Power Boost level can also be envisioned based on the above disclosure and are considered to be within the scope of the present disclosure. For example, a baseline value may be utilized where there is no boost to the normal RS transmit power level. For each KPI threshold factor having an assigned value of 1, the RS transmit power level is increased (boosted) an appropriate amount. In one such embodiment, where the eleven KPI threshold factors described above are considered, and the maximum allowable increase in the RS transmit power is 3 dB, the RS transmit power level may be boosted by approximately 9.09 percent of the baseline level for each KPI threshold factor having an assigned value of 1. The RS Power Boost level may be calculated by multiplying the average of the KPI threshold factors by the normal RS transmit power level and then adding this result to the normal RS transmit power level). In this way, when all eleven KPI threshold factors are assigned a value of 1, the RS Power Boost level is doubled (i.e., increased by 3 dB).

Thus, in this embodiment, the Dynamic RS Power Boost Value (DRSPBV) is calculated as:

DRSPBV=Normal RS Power Level*(1+(Average [KPI threshold factor values]).

Figure 6:
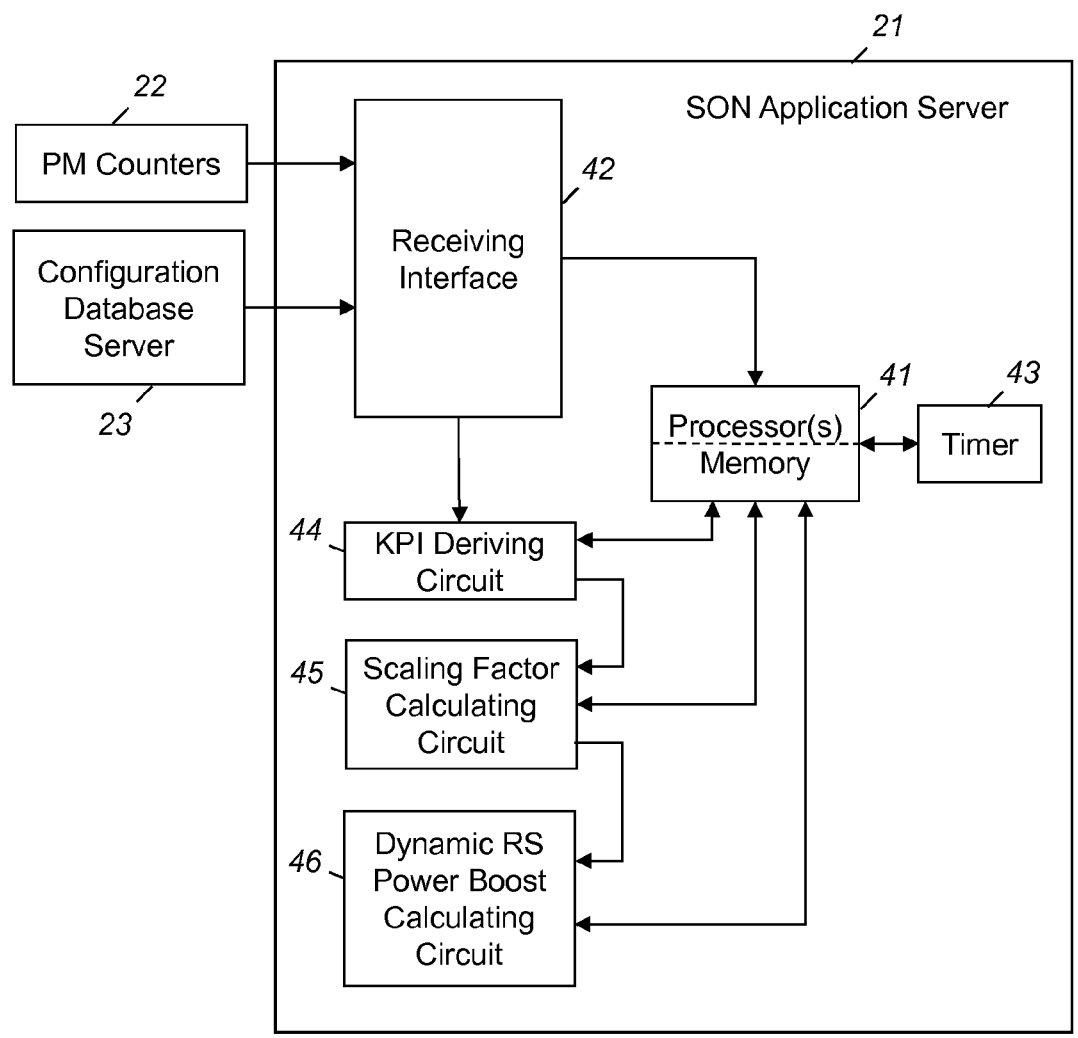
FIG. 6 is a simplified block diagram of a SON Application Server according to an exemplary embodiment of the present disclosure.

FIG. 6 is a simplified block diagram of the SON Application Server 21 according to an exemplary embodiment of the present disclosure. The functions of the SON Application Server may be controlled by one or more processors 41 executing computer program instructions stored in an associated memory. A receiving interface 42 receives network performance information from the PM counters 22 and receives configuration parameters from the configuration database server 23. A timer 43 provides the monitoring time interval for collection of the performance information. The receiving interface may supply the information to the processor 41 and/or directly to a KPI deriving circuit 44. The KPI deriving unit derives a number of network KPIs from the information received from the PM counters and the configuration database server. Further values for each KPI such as the maximum, minimum, or average value of the KPI during the monitoring time interval may then be determined, and compared against an associated threshold to determine a corresponding number of KPI threshold factors. Values of 1 or 0 are assigned to each corresponding KPI threshold factor, depending upon the outcome of the threshold comparison.

The KPI threshold values are provided to a scaling factor calculating circuit 45, which calculates the scaling factor from the assigned KPI threshold values, for example by calculating the average of the assigned values.

The scaling factor is provided to a dynamic RS Power Boost calculating unit 46, which calculates the dynamic RS Power Boost level by applying the scaling factor to the baseline RS Power Boost level.

Thus, as shown and described, a Scaling Factor value may be computed by the SON Server and dynamically altered based on the monitored network performance factors and their respective predefined threshold values. The scaling factor may then be utilized to dynamically control the level of RS Power Boost.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method performed in a Self-Optimized Network (SON) Application Server for dynamically determining a Reference Signal (RS) Power Boost level in a radio telecommunication network, the method comprising:
monitoring a plurality of network performance indicators for a monitoring time interval;
calculating a scaling factor based on values of the plurality of network performance indicators measured or computed during the monitoring time interval; and
calculating a dynamic RS Power Boost level by applying the scaling factor to a baseline RS Power Boost level;
wherein calculating the scaling factor based on values of the plurality of network performance indicators includes:
evaluating the plurality of network performance indicators to determine a corresponding plurality of performance threshold factors, wherein each given network performance indicator is evaluated to determine whether the value of the given network performance indicator during the monitoring interval causes an associated threshold to be exceeded;
when the associated threshold is exceeded, assigning a first value to a performance threshold factor corresponding to the given network performance indicator;
when the associated threshold is not exceeded, assigning a different, second value to the performance threshold factor corresponding to the given network performance indicator; and
calculating the scaling factor based on the assigned values of the plurality of performance threshold factors corresponding to the plurality of network performance indicators.

2. The method according to claim 1, wherein:
monitoring includes monitoring the plurality of network performance indicators for a monitoring time interval; and
calculating the scaling factor includes calculating the scaling factor based on values of the plurality of network performance indicators measured or computed during the monitoring time interval.

3. The method according to claim 2, wherein the monitoring time interval is user-defined and is in a range of 15 minutes to three days.

4. The method according to claim 1, wherein each of the performance threshold factors is assigned a value of 1 or 0.

5. The method according to claim 4, wherein calculating the scaling factor based on the assigned values of the plurality of performance threshold factors includes calculating an average of the values assigned to the plurality of performance threshold factors to obtain the scaling factor.

6. The method according to claim 5, wherein the baseline RS Power Boost level is a maximum allowed RS Power Boost value, and calculating the dynamic RS Power Boost level includes multiplying the maximum allowed RS Power Boost value in decibels, dB, by the calculated scaling factor;
wherein the dynamic RS Power Boost level indicates the amount in dB that a normal RS transmit power level is to be boosted.

7. The method according to claim 5, wherein the baseline RS Power Boost level is a normal RS transmit power level, and calculating the dynamic RS Power Boost level includes multiplying the normal RS transmit power level by the calculated scaling factor to obtain a result;
wherein the result is added to the normal RS transmit power level to achieve a boosted RS transmit power level.

8. The method according to claim 1, wherein monitoring includes monitoring at least one network performance indicator selected from a group consisting of:
Average Downlink (DL) Channel Quality Indicator (CQI) Threshold Factor (AvgDlCqiThreshFactor);

Average Uplink (UL) Signal to Interference and Noise Ratio (SINR) Threshold Factor (AvgUlSinrThreshFactor);
Average UL Received Signal Strength Indicator (RSSI) Threshold Factor (AvgUlRssiThreshFactor);
Maximum Timing Advance Value Threshold Factor (MaxTaThreshFactor);
Power Headroom Report Threshold Factor (PHRThreshFactor);
Maximum UL/DL Block Error Rate (BLER) Threshold Factor (MaxUlDlBlerThreshFactor);
Physical Resource Block Scheduling (PRB/SCH) Utilization Factor (PrbUlDlUtilizationThreshFactor);
Random Access Channel (RACH) Failure Rate Threshold Factor (PrachFailTdThreshFactor);
Connected Users Limit Threshold Factor (ConnectUsersThreshFactor);
IntraLTE Neighbor Threshold Factor (IntraLteNbrThreshFactor); and
Multiple Input Multiple Output (MIMO) Mode Threshold Factor (MimoModeThreshFactor).

9. The method according to claim 8, wherein calculating the scaling factor includes calculating an average of the values of the monitored network performance indicators.

10. A Self-Optimized Network (SON) Application Server configured to dynamically determine a Reference Signal (RS) Power Boost level in a radio telecommunication network, the SON Application Server comprising:
a receiving interface configured to receive network performance information and configuration parameters from the network for a monitoring time interval; and
one or more processing circuits configured to:
derive a plurality of network performance indicators from the received performance information and configuration parameters;
calculate a scaling factor based on values of the plurality of network performance indicators measured or computed during the monitoring time interval; and
calculate a dynamic RS Power Boost level by applying the scaling factor to a baseline RS Power Boost level;
wherein the one or more processing circuits are further configured to calculate the scaling factor based on values of the plurality of network performance indicators by performing the following:
evaluating the plurality of network performance indicators to determine a corresponding plurality of performance threshold factors, wherein each given network performance indicator is evaluated to determine whether the value of the given network performance indicator during the monitoring interval causes an associated threshold to be exceeded;
when the associated threshold is exceeded, assigning a first value to a performance threshold factor corresponding to the given network performance indicator;
when the associated threshold is not exceeded, assigning a different, second value to the performance threshold factor corresponding to the given network performance indicator; and
calculating the scaling factor based on the assigned values of the plurality of performance threshold factors corresponding to the plurality of network performance indicators.

11. The SON Application Server according to claim 10, wherein the one or more processing circuits are configured to:
monitor the plurality of network performance indicators for a monitoring time interval; and
calculate the scaling factor based on values of the plurality of network performance indicators measured or computed during the monitoring time interval.

12. The application server according to claim 11, wherein the monitoring time interval is user-defined and is in a range of 15 minutes to three days.

13. The SON Application Server according to claim 10, wherein each of the performance threshold factors is assigned a value of 1 or 0.

14. The SON Application Server according to claim 13, wherein the one or more processing circuits are further configured to calculate the scaling factor by calculating an average of the values assigned to the plurality of performance threshold factors to obtain the scaling factor.

15. The SON Application Server according to claim 14, wherein the baseline RS Power Boost level is a maximum allowed RS Power Boost value, and the one or more processing circuits are configured to calculate the dynamic RS Power Boost level by multiplying the maximum allowed RS Power Boost value in decibels, dB, by the calculated scaling factor;
wherein the dynamic RS Power Boost level indicates the amount in dB that a normal RS transmit power level is to be boosted.

16. The SON Application Server according to claim 14, wherein the baseline RS Power Boost level is a normal RS transmit power level, and the one or more processing circuits are configured to calculate the dynamic RS Power Boost level by multiplying the normal RS transmit power level by the calculated scaling factor to obtain a result;
wherein the result is added to the normal RS transmit power level to achieve a boosted RS transmit power level.

17. The SON Application Server according to claim 10, wherein the plurality of network performance indicators are selected from a group consisting of:
Average Downlink (DL) Channel Quality Indicator (CQI) Threshold Factor (AvgDlCqiThreshFactor);
Average Uplink (UL) Signal to Interference and Noise Ratio (SINR) Threshold Factor (AvgUlSinrThreshFactor);
Average UL Received Signal Strength Indicator (RSSI) Threshold Factor (AvgUlRssiThreshFactor);
Maximum Timing Advance Value Threshold Factor (MaxTaThreshFactor);
Power Headroom Report Threshold Factor (PHRThreshFactor);
Maximum UL/DL Block Error Rate (BLER) Threshold Factor (MaxUlDlBlerThreshFactor);
Physical Resource Block Scheduling (PRB/SCH) Utilization Factor (PrbUlDlUtilizationThreshFactor);
Random Access Channel (RACH) Failure Rate Threshold Factor (PrachFailTdThreshFactor);
Connected Users Limit Threshold Factor (ConnectUsersThreshFactor);
IntraLTE Neighbor Threshold Factor (IntraLteNbrThreshFactor); and
Multiple Input Multiple Output (MIMO) Mode Threshold Factor (MimoModeThreshFactor).

18. The SON Application Server according to claim 17, wherein the one or more processing circuits are configured to calculate the scaling factor by calculating an average of the values of the network performance indicators.

19. A Self-Optimized Network (SON) for optimizing performance in the SON and an associated radio access network, the SON comprising:
 a plurality of Performance Management (PM) counters configured to measure and report network performance information;
 a database server configured to mediate network configuration parameters; and
 a SON application server configured to dynamically determine a Reference Signal (RS) Power Boost level, the SON application server comprising:
  a receiving interface configured to receive the network performance information from the PM counters and the configuration parameters from the database server for a monitoring time interval; and
  one or more processing circuits configured to:
   derive a plurality of network performance indicators from the performance information and configuration parameters received during a monitoring time interval;
   calculate a scaling factor based on values of the plurality of network performance indicators measured or computed during the monitoring time interval; and
   calculate a dynamic RS Power Boost level by applying the scaling factor to a baseline RS Power Boost level;
  wherein the one or more processing circuits are further configured to calculate the scaling factor based on values of the plurality of network performance indicators by performing the following:
   evaluating the plurality of network performance indicators to determine a corresponding plurality of performance threshold factors, wherein each given network performance indicator is evaluated to determine whether the value of the given network performance indicator during the monitoring interval causes an associated threshold to be exceeded;
   when the associated threshold is exceeded, assigning a first value to a performance threshold factor corresponding to the given network performance indicator;
   when the associated threshold is not exceeded, assigning a different, second value to the performance threshold factor corresponding to the given network performance indicator; and
   calculating the scaling factor based on the assigned values of the plurality of performance threshold factors corresponding to the plurality of network performance indicators.

20. The SON Application Server according to claim 19, wherein the plurality of network performance indicators are selected from a group consisting of:
 Average Downlink (DL) Channel Quality Indicator (CQI) Threshold Factor (AvgDlCqiThreshFactor);
 Average Uplink (UL) Signal to Interference and Noise Ratio (SINR) Threshold Factor (AvgUlSinrThreshFactor);
 Average UL Received Signal Strength Indicator (RSSI) Threshold Factor (AvgUlRssiThreshFactor);
 Maximum Timing Advance Value Threshold Factor (MaxTaThreshFactor);
 Power Headroom Report Threshold Factor (PHRThreshFactor);
 Maximum UL/DL Block Error Rate (BLER) Threshold Factor (MaxUlDlBlerThreshFactor);
 Physical Resource Block Scheduling (PRB/SCH) Utilization Factor (PrbUlDlUtilizationThreshFactor);
 Random Access Channel (RACH) Failure Rate Threshold Factor (PrachFailTdThreshFactor);
 Connected Users Limit Threshold Factor (ConnectUsersThreshFactor);
 IntraLTE Neighbor Threshold Factor (IntraLteNbrThreshFactor); and
 Multiple Input Multiple Output (MIMO) Mode Threshold Factor (MimoModeThreshFactor).

21. The SON Application Server according to claim 20, wherein the one or more processing circuits are configured to calculate the scaling factor by calculating an average of the values of the network performance indicators.

* * * * *